(12) United States Patent
Thomas

(10) Patent No.: US 10,604,428 B2
(45) Date of Patent: Mar. 31, 2020

(54) WASTE WATER TREATMENT

(71) Applicant: Robert Charles Llewelyn Thomas, Dyfed (GB)

(72) Inventor: Robert Charles Llewelyn Thomas, Dyfed (GB)

(*) Notice: Subject to any disclaimer, the term of this patent is extended or adjusted under 35 U.S.C. 154(b) by 25 days.

(21) Appl. No.: 15/773,585

(22) PCT Filed: Nov. 3, 2016

(86) PCT No.: PCT/GB2016/053422
§ 371 (c)(1),
(2) Date: May 4, 2018

(87) PCT Pub. No.: WO2017/077311
PCT Pub. Date: May 11, 2017

(65) Prior Publication Data
US 2018/0319679 A1  Nov. 8, 2018

(30) Foreign Application Priority Data
Nov. 4, 2015 (GB) .................................. 1519457.4

(51) Int. Cl.
C02F 1/463 (2006.01)
C02F 1/461 (2006.01)

(52) U.S. Cl.
CPC .......... *C02F 1/463* (2013.01); *C02F 1/46109* (2013.01); *C02F 2001/46123* (2013.01); *C02F 2201/4612* (2013.01)

(58) Field of Classification Search
CPC ............ C02F 2001/46123; C02F 1/461–4698
See application file for complete search history.

(56) References Cited

U.S. PATENT DOCUMENTS

| | | | | |
|---|---|---|---|---|
| 3,944,478 A | * | 3/1976 | Kuji .................... | C02F 1/46109 210/192 |
| 5,543,030 A | * | 8/1996 | Shiramizu ......... | H01L 21/02052 205/464 |
| 5,599,438 A | * | 2/1997 | Shiramizu ................ | C02F 1/36 205/746 |
| 7,374,693 B1 | | 5/2008 | Routberg (Rutberg) et al. | |

(Continued)

FOREIGN PATENT DOCUMENTS

| GB | 0892628 A | 3/1962 |
|---|---|---|
| JP | 2000279962 A | 10/2000 |

(Continued)

*Primary Examiner* — Steven A. Friday
(74) *Attorney, Agent, or Firm* — Dinsmore & Shohl LLP

(57) ABSTRACT

A waste water treatment apparatus utilizing electrochemical technology. Electrochemical waste water treatment is based on the application of an electric field between an anode and a cathode to the waste water. The apparatus for waste water treatment comprise a channel extending through a housing between an inlet and an outlet and a water treatment zone between the inlet and outlet. The apparatus further comprise first and second spaced apart electrodes having working ends for treating waste water in the treatment zone, and an electrode feed arrangement for feeding the first and second electrodes towards the channel to control the spacing between the working ends of the first and second electrodes.

17 Claims, 9 Drawing Sheets

(56) References Cited

U.S. PATENT DOCUMENTS

| 7,413,667 B1 * | 8/2008 | Routberg | B82Y 30/00 |
| | | | 204/554 |
| 2011/0088802 A1 | 4/2011 | Bryden | |
| 2015/0246830 A1 * | 9/2015 | Lalli | C02F 1/463 |
| | | | 204/230.3 |

FOREIGN PATENT DOCUMENTS

| WO | 9738815 A1 | 10/1997 |
| WO | 2011066632 A1 | 6/2011 |

\* cited by examiner (a)

(b)

WASTE WATER TREATMENT

CROSS-REFERENCE TO RELATED APPLICATIONS

This application is the U.S. national stage of PCT/GB2016/053422 filed Nov. 3, 2016, which claims priority of United Kingdom Patent Application 1515194.5 filed Nov. 4, 2015 of which is hereby incorporated by reference in its entirety.

FIELD OF THE INVENTION

The present invention relates to a waste water treatment apparatus utilising electrochemical technology.

BACKGROUND OF THE INVENTION

Electrochemical waste water treatment is based on the application of an electric field between an anode and a cathode to the waste water. The current passing between the anode and cathode through the waste water causes a series of chemical reactions which causes impurities to form gel like clusters which facilitate their extraction via filtration and/or settlement or alternatively leads to electrochemical production of disinfecting species from the water itself or from species dissolved in the water. As such, a by-product of electrochemical treatment is the production of gases including hydrogen and oxygen.

Known systems involve the placement of an anode and cathode into a fixed body of water and application of a current between these electrodes. The process means that the electrodes are rapidly contaminated and eroded, particularly if a high current is placed through them which is typical in order to accelerate the process. Furthermore, the treatment process has to be regularly interrupted to replenish the waste water for treatment and also to replace the electrodes which is time consuming and expensive.

An alternative arrangement is to provide a conduit through which waste water is passed. Anodes and cathodes are provided on the internal surface of the conduit and as the waste water is passed through the conduit current is passed between the anode and cathode thus treating the moving water. Again, however, the electrodes quickly erode requiring regular replacement leading to significant downtime.

SUMMARY OF THE INVENTION

The present invention provides an improved arrangement.

According to the present invention there is apparatus for waste water treatment comprising a channel extending through a housing between an inlet and an outlet and comprising a water treatment zone between the inlet and outlet, the apparatus further comprising first and second spaced apart electrodes having working ends for treating waste water in the treatment zone, and an electrode feed arrangement for feeding the first and second electrodes towards the channel to control the spacing between the working ends of the first and second electrodes.

There are significant advantages associated with the present invention.

A first advantage is that a fixed body of water is not utilised. The waste water can be treated as it flows between the inlet and outlet and thus is a continuous process.

A second advantage is that as the first and second electrodes form first and second wall portions of the housing and are moveably mounted relative to the housing, the space between the first and second electrodes can be controlled. As such, the space in between the first and second electrodes can be maintained substantially constant, which has the effect of improved consistency associated with extraction of pollutants. This is because a constant current can be passed between the electrodes which does not have to be altered as a result of wear of the electrodes. In known systems the separation between first and second electrodes increases thus requiring a greater current to achieve the same treatment capacity. Accordingly, as the electrodes of the invention wear they can be moved to ensure that the electrode contact surface remains in substantially the same position thus taking into account the wear.

A third advantage associated with the capability of the electrodes moving is that there is no or minimal interruption on the inner surface of the housing in the treatment zone. In known systems the electrodes typically extend into the fluid flow in order to accommodate wear. In the present invention wear is accommodated for by the ability to move the electrode as wear occurs meaning that the electrodes do not necessarily have to protrude into the fluid flow but may instead sit flush against the internal surface of the housing defining the treatment zone.

A fourth advantage is the significantly reduced down time associated with the treatment system. The treatment system can be operated for long periods of time without requiring shut down in order to replenish the electrodes. The requirement to shut down the process is only limited by the length of the electrodes which can be made extremely large relative to the housing. The length of the electrodes is only limited by manufacturing capability or by the capability of the housing and/or any support structure to accommodate the electrode. The apparatus further enables a large surface area of the working ends of the electrodes to be achieved.

A fifth advantage of the present invention is that no complex manufacturing processes are required for producing the electrodes. Furthermore, complex securing arrangements for holding the electrodes in a waste water bath or flow are not required as they are moveably mounted relative to the housing.

A sixth advantage is that there is minimal waste associated with the electrode material. Known systems utilise fixed electrodes. After a pre-determined time and once they have worn to a pre-determined degree their effectiveness significantly decreases. As such, even though a significant proportion of the electrode material may remain the electrode is not functioning correctly to treat the waste water and as such must be replaced. In the present invention, as the first and second electrodes are moveable this effect is substantially negated and approximately 95% of the electrode material can be used before replacement.

It will be appreciated that the working ends of the first and second electrodes each have an active surface in communication with the waste water flow. The working ends of the electrodes are spaced apart across the channel. The working ends preferably form first and second wall portions of the channel. The working ends of the electrodes that contact the waste water flow are therefore preferably aligned with the wall of the housing defining the channel. The first and second electrodes preferably oppose each other and form the anode and cathode. The first and second electrodes are preferably aligned transversely to the waste water flow.

The housing and electrodes are together typically termed a reactor.

The channel preferably comprises a chamber in the housing. The provision of a second outlet for release of gas from the chamber in the housing is beneficially provided as the gas that is produced during processing can be captured and re-used. In particular, hydrogen can be captured and processed to form a useable fuel. The gas can be collected continuously as the water treatment progresses.

The first and second electrode beneficially project through a first and second window respectively provided in the housing from external of the housing so the working ends remain appropriately spaced apart in the treatment zone. As such, the electrodes can be fed continuously through the housing to enable the working ends to be present in the channel. It is beneficial that the cross sectional profile of the first and second window beneficially substantially match the cross sectional profile of the first and second electrodes respectively.

A seal arrangement is beneficially provided for providing a seal between the electrode and the window. An O-ring seal may be utilised. A seal is necessary to ensure that waste water flow does not escape through the flow path between the peripheral edge of the window and the electrodes. It is beneficial that the first and second electrodes are substantially perpendicular to the flow direction of the waste water through the channel. This means that waste water escaping through this flow path is minimised. Furthermore, an advantage of the present invention is that the first and second working ends form first and second wall portions of the channel that are substantially aligned with the wall of the housing defining the channel. This means that there is minimal interruption to the cross sectional profile of the channel passing between the inlet and the outlet. This means that there is no dead zone for deposits to build up and no reduction in flow nor electrical fluctuations. No matter how long the treatment apparatus operates this remains constant.

The electrodes are beneficially slideably mounted relative to the housing. The electrodes beneficially slide through the respective windows. The cross sectional profile of the electrodes and windows may be variable dependent upon the particular apparatus, however, it is beneficial that the cross sectional profile of the window and the electrode for a particular application are substantially the same to ensure minimal chance of leakage. A substantially square or rectangular profile may be utilised.

An electrode feed arrangement is provided for feeding the working end of the first and second electrodes into the channel. Preferably, a first and second electrode feed arrangement are provided for feeding the first and second electrodes respectively. The feed arrangement may be manually operable or may be automatically operable dependent upon the particular application requirements. For example, manually operable positioning arrangements are beneficial in extreme environments, and complexity of the whole system is appropriately reduced.

A sensor arrangement is preferably provided for sensing relative positioning of the working ends of the first and/or second electrodes, and a control arrangement is configured such that in the event one or both of the working ends of first and/or second electrodes are misaligned, a signal is sent to the electrode feed arrangement to cause realignment of the working ends of the first and/or second electrodes. Misalignment means that the first and second wall portions are either extending too far into the channel or are set back from the wall of the housing defining the channel therefore providing a recessed area. Such a recessed area would provide a dead zone for detrimental deposits to build up. It is beneficial that this is avoided and may be automatically avoided utilising an appropriate sensor arrangement.

The first and second electrodes are beneficially disposed substantially perpendicular to the flow direction of the waste water through the channel. The working ends of the first and second electrodes respectively are beneficially substantially perpendicular to the flow direction of the waste water through the channel.

The present invention also extends to a plurality of housings in series, such that a flow path is defined between the outlet of a first housing and the inlet of a second housing.

There is further beneficially provided a frame structure for stacking a plurality of housings.

Aspects of the present invention will now be described by way of example only with reference to the accompanying drawings in which:

DETAILED DESCRIPTION OF THE PREFERRED EMBODIMENTS

Figure 1:
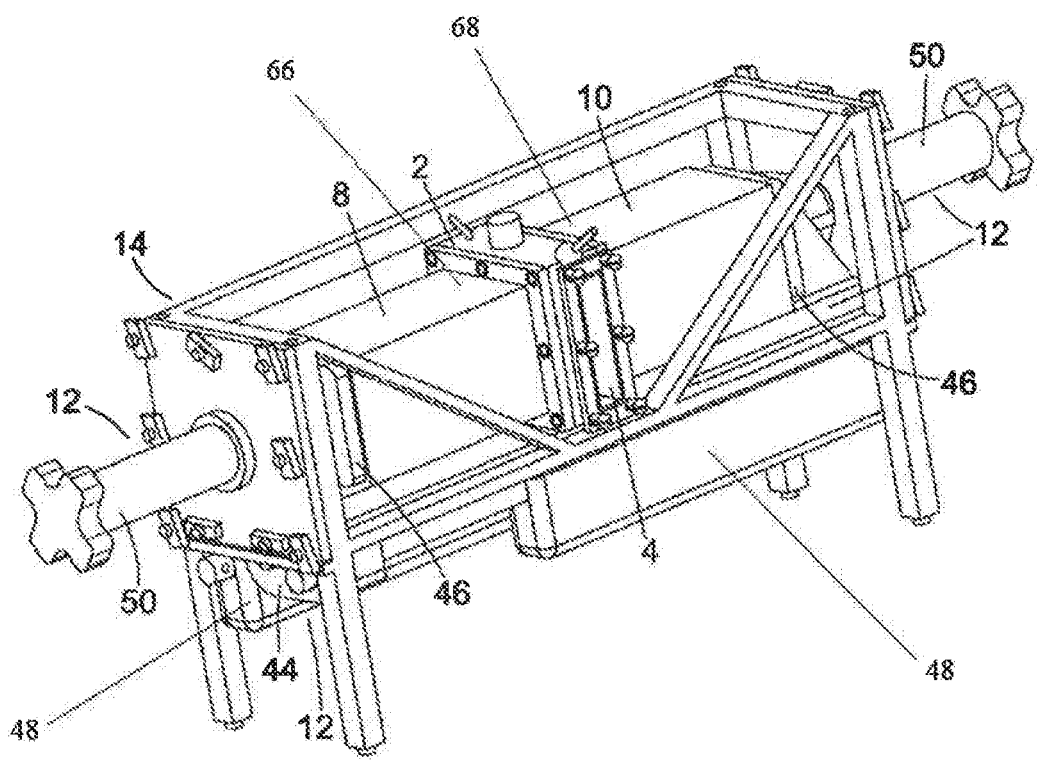
FIG. 1 is a schematic perspective view of an exemplary embodiment of the present invention.
Figure 5:
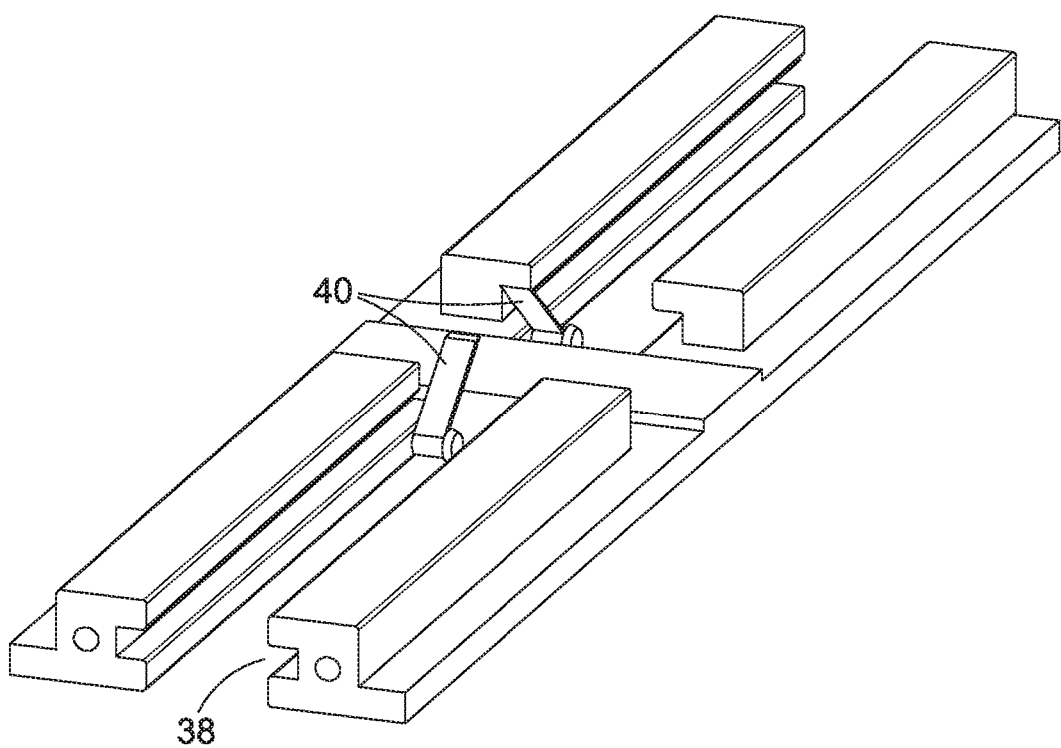
FIG. 5 is a schematic presentation of an electrode base plate support for use in an exemplary embodiment of the present invention.

Referring to FIG. 1 there is an apparatus according to an exemplary embodiment comprising a housing 2 having a channel extending therethrough between an inlet 4 and an outlet (not shown). A channel is defined between the inlet 4 and the outlet through, which waste water is arranged to pass. First and second spaced apart electrodes 8, 10 are provided and each of the first and second electrodes 8, 10 form first and second wall portions of the channel through which the waste water passes. The wall portions may also be termed working ends of the electrodes. The working ends 66, 68, respectively, of the electrodes 8, 10 are those ends in communication with the waste water flow. The first and second electrodes 8, 10 are shown extending through the housing, and project outwardly from the housing. The electrodes 8, 10 are moveable relative to the housing to control the spacing between the first and second wall portions of the electrodes, and are arranged to be fed into the housing in order to provide the working ends of the electrodes in contact with the waste water flow. An electrode positioning arrangement 12 is beneficially provided, wherein each electrode positioning arrangement 12 may independently move each of the electrodes 8, 10. The electrode positioning arrangement may take various forms including automated or manual arrangements and is shown in more detail in FIGS. 5-7. A frame structure 14 is provided for supporting the electrodes 8, 10 and electrode positioning arrangement 12.

In basic operation, the electrode positioning arrangement causes movement of the electrodes 8, 10 towards one another as the working end of the electrodes wear thus maintaining the separation between the working ends of the electrodes in the channel 20.

Figure 2:
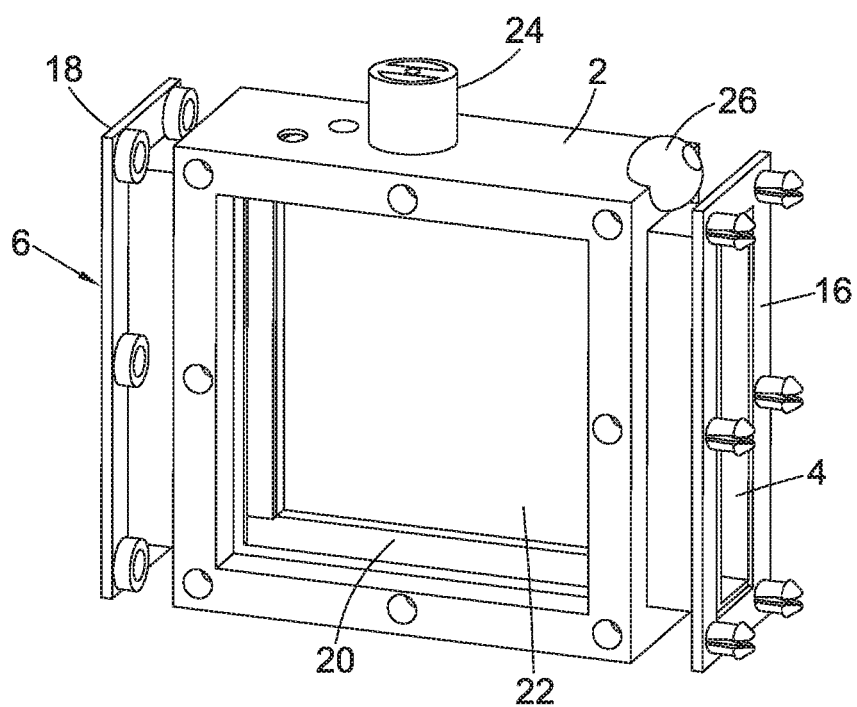
FIG. 2 is a schematic perspective view of the housing without first and second electrodes for use in an exemplary embodiment of the present invention.

Referring now to FIG. 2 there is schematic presentation of the housing 2 shown in more detail including end plates 16, 18 which define the inlet and outlet 4, 6 respectively.

The channel 20 is defined between the inlet 4 and outlet 6. As presented in FIG. 2 without the presence of the electrodes a window 22 is provided such that there is an opening straight through the housing to enable introduction of an electrode through each side of the housing in order to provide electrode wall portions defining the working ends of the electrodes. Further shown in FIG. 2 is gas valve 24 shown in more detail in FIG. 11 for enabling release of gases from the channel 20 during operation. In the exemplary embodiment the channel comprises a chamber formed from the housing and the wall portions of the electrodes.

An adjustment gauge 26 may also be provided extending through an aperture in the housing arranged such that during electrode installation and calibration it can be used to check the gap between the inner wall of the housing defining the channel and the electrode wall portions. The adjustment gauge 26 may be mounted on a ball joint but allows the handle to slide in and out when calibrating to allow a bigger test sweep of the surfaces defining the channel.

The provision of the gas valve 24 allows the hydrogen and oxygen to escape the housing and be collected for later use, preferably in a fuel cell which may in turn power the apparatus. Removal of these gases is carried out at point of source because the gas cannot be treated by the process and for every gas molecule in the fluid space is removed for water molecules to be treated. The bubbles can also cause problems by attaching to the flock, which is the waste precipitate formed as a result of the electrochemical process, making the flock too buoyant which is then difficult to be effectively removed by a downstream filter.

Figure 3:
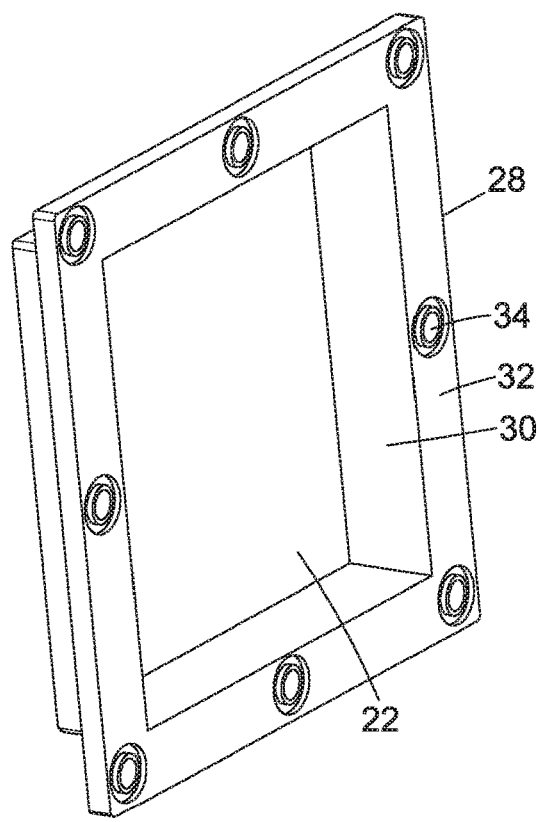
FIGS. 3a and 3b are schematic perspectives views from the front and rear respectively of a guide through which the electrodes project.
Figure 3:
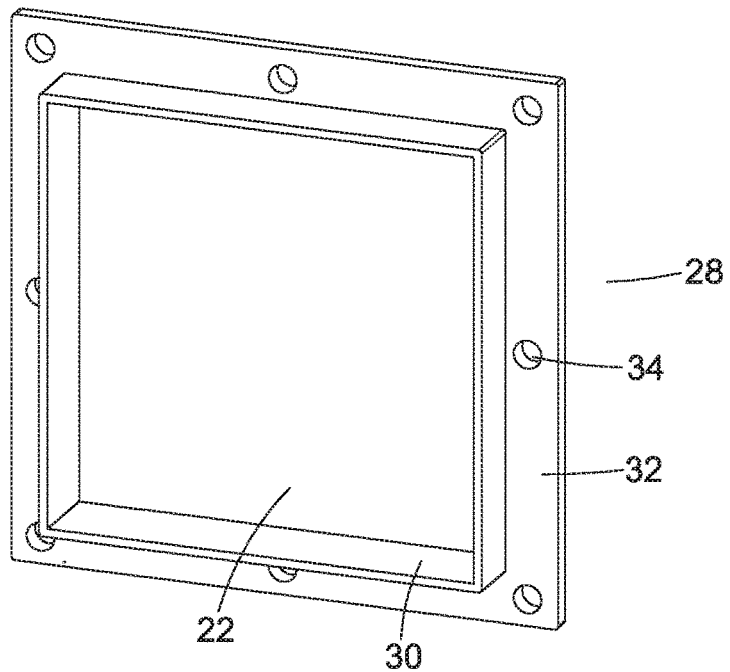

Referring now to FIGS. 3*a* and 3*b* there is presented the front/back plate from a forward and rearward view respectively of the housing. The plate 28 defines the window 22 through which the electrode passes. The plate 28 provides a guide 30 in the form of a channel through which the electrode slides. A flange portion 32 comprising a plurality of fixing apertures 34 enables securing to the other components of the housing. A seal such as an O-ring is preferably provided to seal between the guide 30 and the electrode when the electrode is inserted into the guide 30. It is beneficial that the cross sectional profile of the electrode matches that of the window 22 to provide a snug fit within the guide 30. In a non-limiting example, FIG. 1 shows the cross sectional profile of the first electrode 8 and the second electrode 10 as substantially the same as the first and second windows respectively of the housing 20 to ensure minimum leakage. A substantially square or rectangular profile may be utilized.

Figure 4:
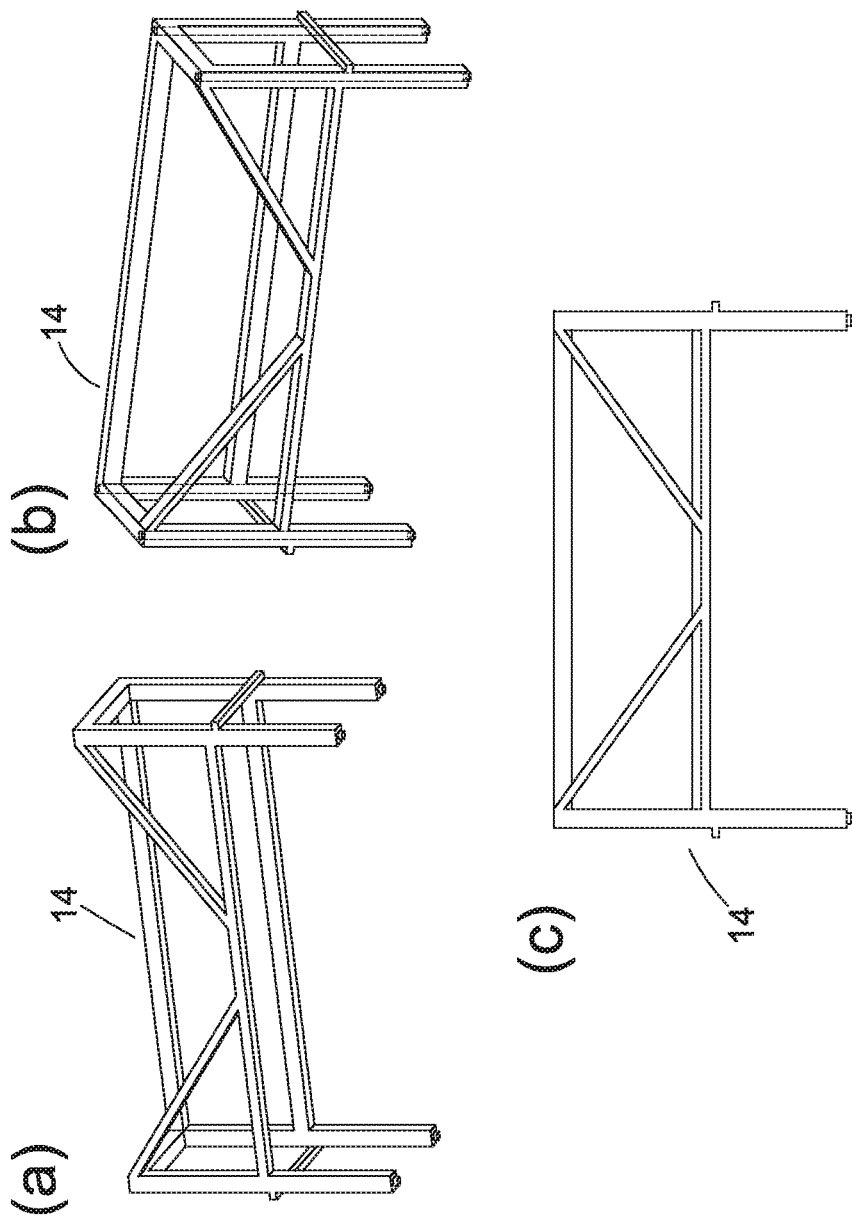
FIGS. 4a, 4b and 4c are views of a frame for use with an exemplary embodiment of the present invention.
Figure 6:
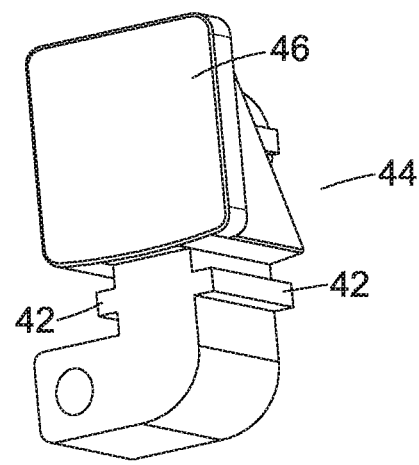
FIGS. 6a and 6b are schematic perspective and front view of an electrode feed plate for use in an exemplary embodiment of the present invention.
Figure 6:
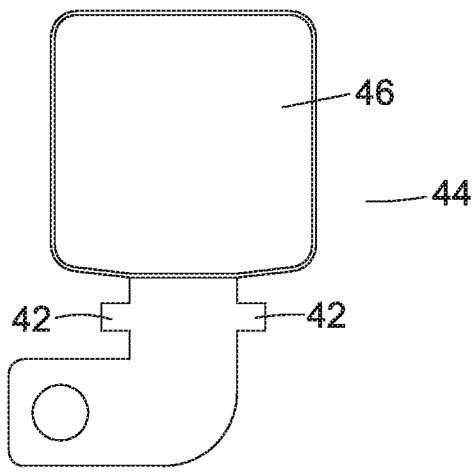
Figure 7:
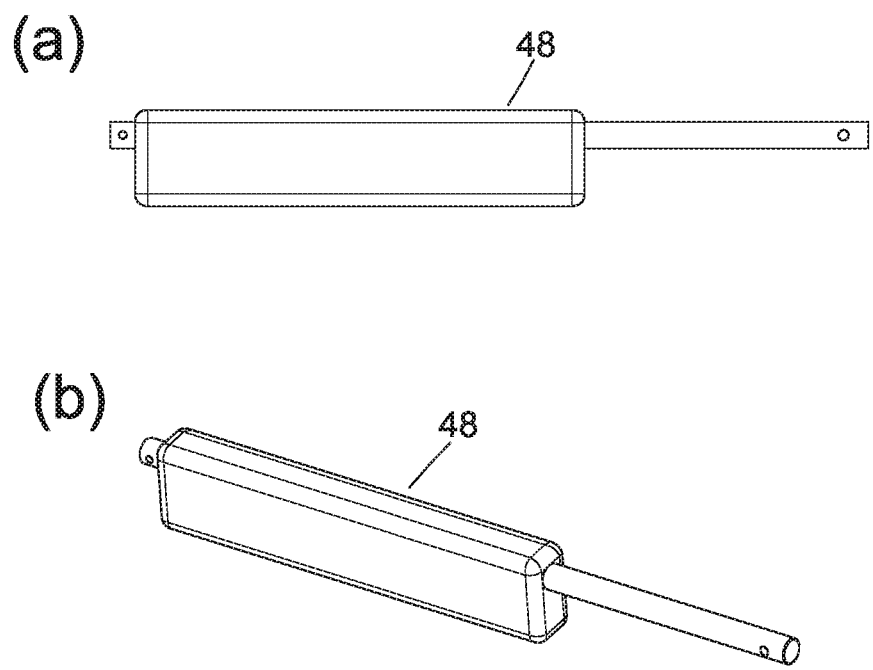
FIGS. 7a and 7b are schematic side and perspective views of an actuator for feeding the electrodes for use with an exemplary embodiment of the present invention.

Referring now to FIG. 4 there is a frame structure 14 provided onto which the housing and electrodes can be mounted. The frame structure 14 provides a stable, stackable and linkable structure allowing the system to be adaptable to the waste stream. Further referring to FIG. 5, the base plate 36 sits into the frame 14 and supports the electrodes and the housing while the guide 38 guides an electrode feed arrangement 44 on a linear path. Electrical connection with the respective electrodes is made via spring loaded copper strips 40 ensuring good contact with the electrodes. Referring also to FIG. 6 in combination with FIG. 5 the guide 38 receives lugs 42 of the electrode feed arrangement 44. The base of the electrode feed arrangement 44 can be seen in FIG. 1. The electrode feed arrangement 44 comprises a plate 46 arranged to drive the electrode forwardly as it is used up in the channel 20 during the electrochemical reaction. The electrode feed arrangement 44 is driven forwardly by the actuator 48 best represented in FIG. 7. The actuator 48 is operable in response to a sensor input to a controller. The actuator 48 drives the electrode feed arrangement 44 such that the plate 46 engages the rearward end of the electrode forcing the electrode towards the channel 20. The actuator is beneficially an electronically operated linear actuator and applies a linear force to the electrode feed arrangement 44 driving the electrode towards the channel 20. In the embodiment as presented in FIG. 1, a manual adjustment screw 50 is provided used to advance the electrode where the system is set up for manual operation or a new electrode is being fitted. The adjustment screw 50 is threaded and rotates such that a tip of the screw 50 engages the rearward end of the electrode feed arrangement 44 thus driving the plate 46 forwardly and again driving the electrode towards the channel 20.

Figure 8:
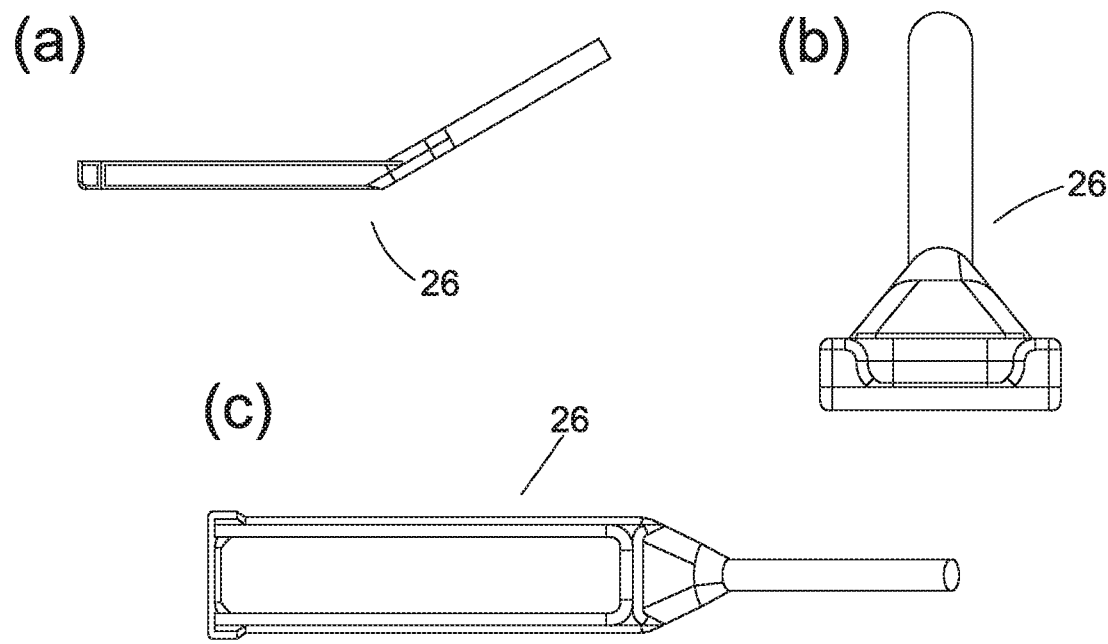
FIGS. 8a to 8c are schematic side, end, and perspective views of an adjustment gauge for use in an apparatus according to an exemplary embodiment of the present invention.

Referring now to FIG. 8, there is provided an adjustment gauge 26, the head of which is shown in FIG. 2. During electrode installation and calibration the adjustment gauge can be utilised to monitor the internal walls of the channel. The adjustment gauge is beneficially mounted on a ball joint that allows the handle to slide in and out when calibrating to allow a bigger test sweep of the internal surface of the channel.

Figure 9:
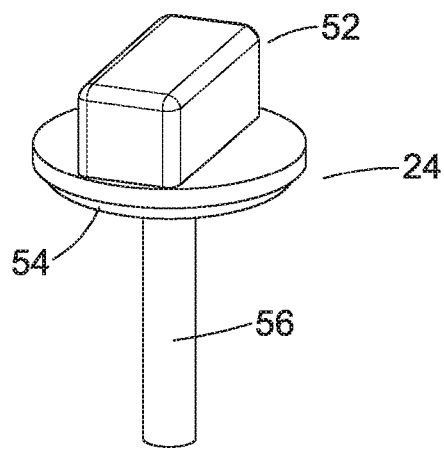
FIG. 9 is a schematic representation of a valve for use in an exemplary embodiment of the present invention.

Referring now to FIG. 9 there is provided a gas valve 24 where the gas valve sits into an opening in the top of the housing. The rectangular head 52 is a float arranged to close the valve when the gas level is low or the waste water level is high and vice versa. The circular chamfered portion 54 is the valve seating while the shaft 56 locates the gas valve 24 into the housing and allows linear motion in a substantially vertical axis.

Figure 10:
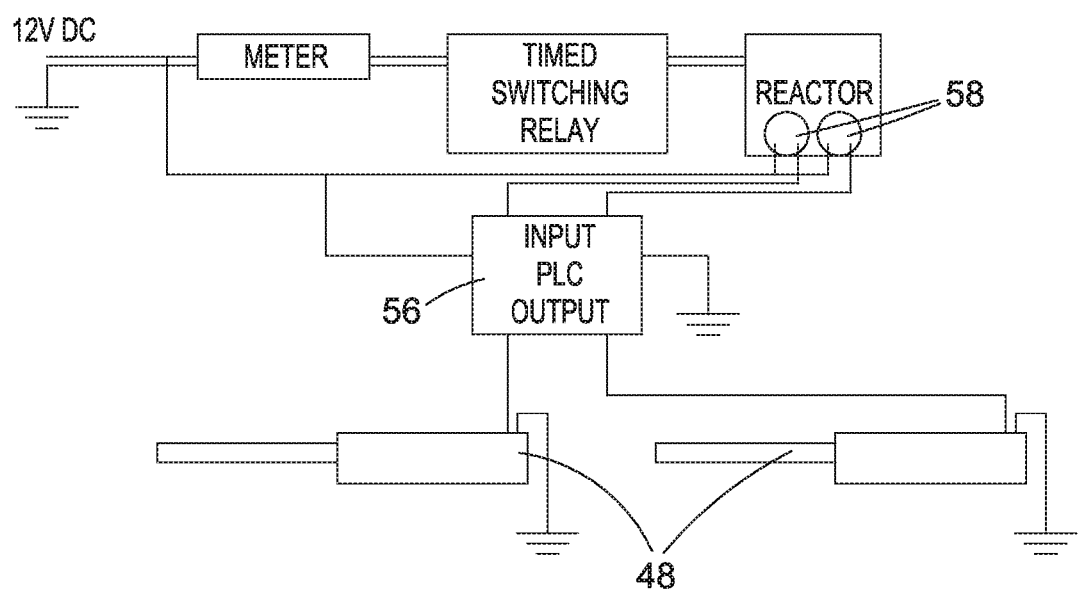
FIG. 10 is a schematic representation of the electrical control circuitry for controlling movement of the electrodes in an exemplary embodiment of the present invention.

Referring now to FIG. 10 there is a schematic representation of the electronic control circuit for operation of the apparatus. The control circuitry is shown to operate actuators 48 via controller 56. A sensor arrangement comprises sensors 58 that are provided to determine wear of the working surface (wall portion) of the electrodes. Accordingly, first and second sensors are provided. As the working surface of the electrode wears then the sensors identify a change in the surface configuration between the wall of the channel defined by the housing and the electrode and identify that a pre-determined recess depth has formed. Accordingly, an output is transmitted from the sensor to the controller 56 which then activates the actuators 48 in order to maintain this separation between the opposing first and second electrodes 8, 10 and in particular the working surfaces of the electrodes that provide wall portions of the channel.

Figure 11:
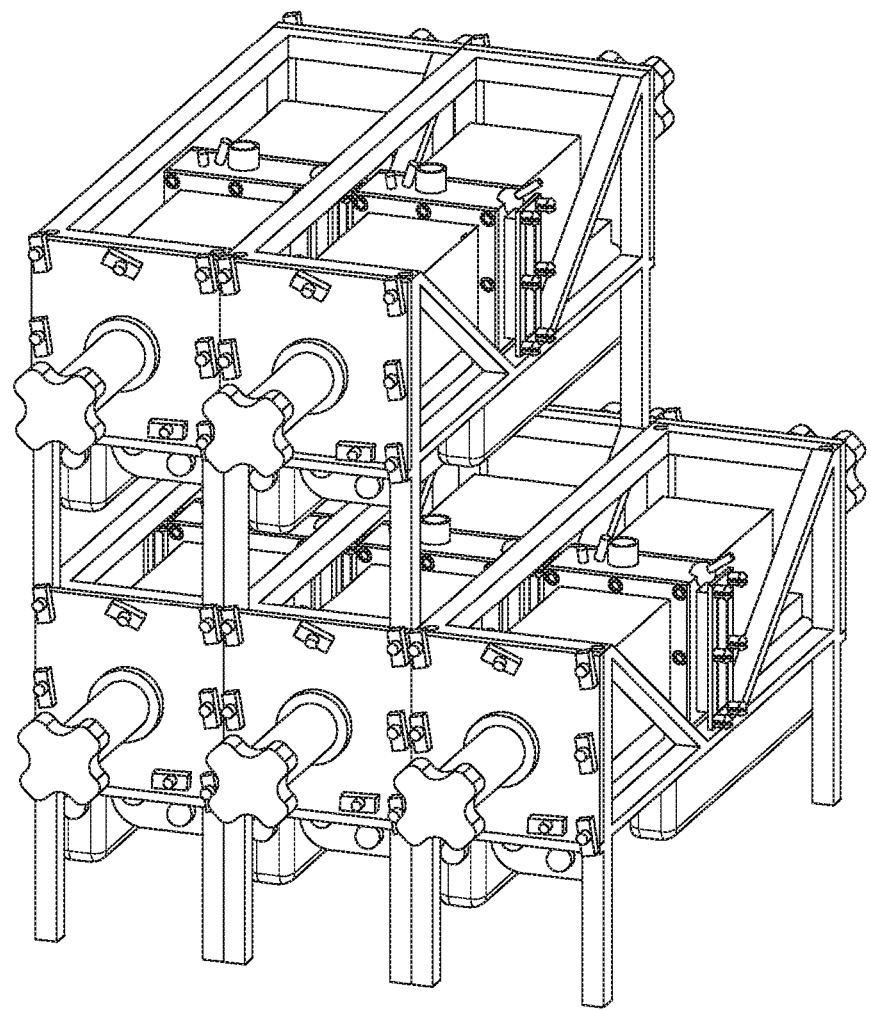
FIG. 11 is a schematic perspective view of a plurality of stacked and layered exemplary embodiments of the present invention.

Referring now to FIG. 11, a plurality of individual linked apparatus are provided held by frame structures 14. The individual frames may be stacked vertically to reduce the foot print maybe be linked horizontally to enable multiple water treatment stages. Linking each apparatus can increase the treatment quality or the flow rates. Space in between each layer allows for the fitment and running of the gas collection lines and electrical services whilst also giving access to the manual adjustment gauges 26.

The present invention allows movement of the working surface of each of the electrodes to ensure that the separation between the electrodes remain constant. Furthermore, there is a significant reduction in the deposits formed on the electrode surfaces as aligning the working surface of the electrode with the channel reduces any recess for deposits to form. As the wear of the electrodes is accounted for through feeding of the electrode to maintain the constant separation, partially or untreated water does not pass through the system. Furthermore, with the present invention down time is minimised as the apparatus can be run continuously for significant length of time without requiring the large electrodes 8, 10 to be replaced. It will further be appreciated that the assembly as shown in FIG. 1 for example is portable and may be positioned on site in relatively remote locations. Waste water can therefore be treated at source.

It will further understood that electrode material may be selected dependent upon particular requirements. In the event a plurality of assemblies being provided in fluid communication in series it is possible to use different electrode materials for different assemblies. It will further be appreciated that the polarity of the anode/cathode can be regularly switched to further discourage impurity build up.

It is further noted that existing systems typically use power sources provided at 120V and 60 A. The effect of this high current is severe degradation of the electrodes. Furthermore, variable electrode wear patterns require complex and expensive power electronics to compensate for these fluctuations. These variations and power spikes can cause the apparatus to "trip out", preventing further waste water treatment until a service engineer can rectify the problems. In the present invention, it is possible to run the apparatus using low power such as 12V at 10-15 A which is a significant power saving. It is not necessary to run at higher power output due to the consistency in electrode wear and electrode separation due to the present invention.

The treated water exiting the apparatus causes the impurities to form gel like clusters which in turn can be filtered downstream.

The present invention has been described above by way of example only and it will be appreciated by the skilled addressee that modification and variations may be made without departing from the scope of protection afforded by the appended claims.

The invention claimed is:

1. An apparatus for waste water treatment, comprising:
  a housing having an inlet and an outlet, and a channel extending through the housing between the inlet and the outlet;
  a water treatment zone defined between the inlet and outlet;
  a first and second spaced apart electrodes each having working ends for treating waste water in the water treatment zone; and
  an electrode feed arrangement operable to feed the first and second spaced apart electrodes towards the channel to control the spacing between the working ends of the first and second spaced apart electrodes.

2. The apparatus according to claim 1, wherein the channel comprises a chamber in the housing.

3. The apparatus according to claim 2, wherein the working ends of the first and second spaced apart electrodes each form a wall portion of the chamber.

4. The apparatus according to claim 3, wherein the electrode feed arrangement is operable to maintain the spacing between the working ends of the first and second spaced apart electrodes.

5. The apparatus according to claim 1, wherein the working ends of the first and second spaced apart electrodes each comprise an active surface, and each of the active surfaces are in the form of a plate.

6. The apparatus according to claim 2, wherein the chamber is defined by a chamber wall and the working ends of the first and second spaced apart electrodes each comprise an active surface that are each substantially aligned with the chamber wall.

7. The apparatus according to claim 2, wherein the housing further comprises a second outlet for release of gas from the chamber.

8. The apparatus according to claim 1, wherein the housing having a first and second window, the first and second spaced apart electrodes projecting through the first and second window in the housing respectively, from outside of the housing to the water treatment zone.

9. The apparatus according to claim 8, wherein a cross sectional profile of the first and second window substantially matches a cross sectional profile of the first and second spaced apart electrodes respectively.

10. The apparatus according to claim 8, further comprising a seal arrangement for providing a seal between at least one of the first and second spaced apart electrodes and at least one of the first and second window.

11. The apparatus according to claim 1, wherein the first and second spaced apart electrodes are slidably mounted relative to the housing.

12. The apparatus according to claim 1, wherein the electrode feed arrangement comprise a first and second feed arrangement for feeding the first and second spaced apart electrodes respectively.

13. The apparatus according to claim 1, further comprising:
  a sensor arrangement for sensing relative positioning of the working ends of the first and/or second spaced apart electrodes; and
  a control arrangement configured such that in the event one or both of the working ends of first and/or second spaced apart electrodes are misaligned, a signal is generated to drive the electrode feed arrangement to cause realignment of the working ends of the first and/or second spaced apart electrodes.

14. The apparatus according, to claim 1, wherein the first and second spaced apart electrodes are disposed substantially perpendicular to a flow direction of the waste water through the channel.

15. The apparatus according to claim 1, further comprising a plurality of housings in series, such that a flow path is defined between an outlet of a first housing and an inlet of a second housing.

16. The apparatus according to claim 1, further comprising a plurality of housings and a frame structure for stacking the plurality of housings.

17. A method of treating waste water, comprising:
  providing the apparatus of claim 1; and
  feeding the first and second spaced apart electrodes towards the channel to control the spacing therebetween.

* * * * *